United States Patent
Wren

(10) Patent No.: US 6,447,421 B1
(45) Date of Patent: Sep. 10, 2002

(54) DEVICE TO PROVIDE CONTINUOUSLY VARIABLE GEARING

(76) Inventor: Nicholas D. Wren, 303 Whitworth Rd., Boerne, TX (US) 78006

(*) Notice: Subject to any disclaimer, the term of this patent is extended or adjusted under 35 U.S.C. 154(b) by 10 days.

(21) Appl. No.: 09/618,513

(22) Filed: Jul. 18, 2000

Related U.S. Application Data

(60) Provisional application No. 60/144,648, filed on Jul. 20, 1999.

(51) Int. Cl.[7] ............................. F16H 3/70; F16H 21/04
(52) U.S. Cl. ......................................... 475/170; 74/117
(58) Field of Search ..................... 74/116, 117, 118, 74/119; 475/170, 178, 207

(56) References Cited

U.S. PATENT DOCUMENTS

| | | | | |
|---|---|---|---|---|
| 3,359,813 A | * | 12/1967 | Okano | 74/117 |
| 4,916,974 A | * | 4/1990 | Kozakae et al. | 475/170 X |
| 5,048,358 A | * | 9/1991 | Shook | 74/117 X |
| 5,454,766 A | * | 10/1995 | Mills | 74/117 X |
| 5,516,132 A | * | 5/1996 | Simkins | 74/117 X |

FOREIGN PATENT DOCUMENTS

| | | | | |
|---|---|---|---|---|
| IT | 338385 | * | 3/1936 | 74/117 |
| JP | 0106461 | * | 5/1988 | 475/170 |
| SU | 0889975 | * | 12/1981 | 74/117 |
| SU | 3613352 | * | 10/1987 | 74/117 |

* cited by examiner

Primary Examiner—Charles A Marmor
Assistant Examiner—Roger Pang
(74) Attorney, Agent, or Firm—Jackson Walker L.L.P.

(57) ABSTRACT

A mechanical transmission device for modifying torque and speed of rotation form torque input to torque output, more particularly a device capable of modifying torque and speed of rotation in a continuously variable fashion utilizing a single set of levers in conjunction with an abaxial ring.

20 Claims, 13 Drawing Sheets

DEVICE TO PROVIDE CONTINUOUSLY VARIABLE GEARING

This application claims priority of U.S. Provisional Application No. 60/144,648, filed under 35 C.F.R. 1.53(b)(2), on Jul. 20. 1999.

BACKGROUND OF THE INVENTION

1. Field of The Invention

A mechanical transmission device for modifying torque and speed of rotation from torque input to torque output, more particularly a device capable of modifying torque and speed of rotation in a continuously variable fashion utilizing a single set of levers in conjunction with an abaxial ring.

2. Background Information

To expand the usefulness of rotary power sources, a variety of variable torque transmission and conversion devices have been developed. Among the most energy efficient variable transmission systems are the incrementally shiftable systems that employ multiple gears or chains and cogs, but these systems generally require an interruption in power during shifts, and where many ratios are required they can become complex, bulky, and difficult to manage. Continuously variable transmissions offer greater versatility and simplify shifting operations, but all have limitations which make them more suitable for some applications than others.

The hydraulic or electrical drives, where a motor is driven by a pump or generator, are among the most versatile continuously variable drives, but they tend to be massive and not very energy efficient, so their use has mostly been restricted to heavy industry and high-load work and transport machinery.

Limited slip differential drives employ a split in the torque path with a brake or clutch or something to provide variable drag to select between paths having different ratios. Energy efficiency is good when either path is fully selected, but there are friction losses in all intermediate positions and the intermediate ratios tend to be unstable because the constancy of a given ratio is only as good as the proportionality between the friction and the power load.

Traction drives—where a ring, disk, or belt frictionally engages a disk, cone, or sphere at varying radii—have stable ratios throughout their range and are often more energy efficient than limited-slip drives in the intermediate ratios, but the power is transmitted through a rolling frictional interface. This interface can slip if the shear load from the power exceeds the friction, and it tends to be a focal point for wear and energy loss problems.

Potentially some the most energy efficient of the continuously variable drives are the oscillation drives, where rotary power is converted to oscillating power and then back again to rotary power and variable gearing is achieved by varying the amplitude of the oscillations. Rotary power loses directionality when converted to oscillating power, so there is usually a directional freewheeling mechanism which imparts directionality when converting back to rotary power, so reversing the direction of the input rotary power will typically not reverse the direction of the output rotary power; and most oscillation drives are not symmetrical such that the roles of input and output elements can be swapped. To have continuous power transmission, there must be at least two oscillating elements, each to take the load while the other is returning. Also, oscillation drives tend not to be very compact. However, oscillation drives have stable ratios and they can entirely eliminate the frictional rolling interfaces that traction drives require, so the efficiency and durability can be good. The main design challenges of the oscillation drives have been to have the oscillating elements receive and deliver power as tangentially as possible to the rotary elements while keeping the total number of elements as few as possible.

The device of this application is a rotary transmission device with some, but not all, of the properties of a typical oscillation drive. Like most oscillation drives, the output power is unidirectional, and reversing the direction of rotary input power will merely freewheel the input torque element rather than drive the output element in reverse. Unlike most oscillation drives, however, applicants device is symmetrical in that it is arbitrary which is the drive element and which is the driven element. If applicants device is flipped end-for-end, it will operate to convert torque identically.

Applicants torque transmission device has utility, for example where an unlimited number of stable gear ratios over a certain range is of benefit and where high efficiency, reasonable simplicity, and compactness are desired. This can have applications in diverse areas including pumps (giving non-variable displacement pumps variable output); endless double-loop chain hoists; machinery and conveyance timing; mopeds and other low-power vehicles that currently employ belts and expandable pulleys; and many forms of human-powered vehicles. Probably the most familiar and common of these machines is the bicycle, so for purposes of illustration, this device is herein described with particular reference to bicycles with the understanding that it can have uses for other machines as well.

Despite several attempts to give bicycles continuously variable transmissions, virtually all contemporary multi-speed bicycles still shift in discrete steps; that is, they experience a jump in gearing when shifting from one gear ratio to another. An advantage is seen in having a torque transmission device which can operate on bicycles as they exist without requiring extensive modification of the basic bicycle form; which has energy efficiency similar to that of existing multi-speed drives; which drives when pedalling forward and freewheels when pedalling backward; which permits coasting (rolling without the application of power); which is compact and reasonably lightweight; and importantly, which can provide an unlimited number of stable gear ratios, continuously selectable over a finite range, which can be selected at any time whether stopped, coasting, or pedalling. Applicant proposes the device of this application as such a device.

SUMMARY OF THE INVENTION

Applicant's invention employs a rotating torque input element such as a drive ring or shaft on a primary axis (the primary axis being an arbitrary reference axis which may be coincident with the axis of a wheel, pulley, crank, gear, or any other rotatable element for delivering or receiving torque); a rotating torque output element such as a ring or shaft, also on the primary axis; a multiplicity of levers radiating from the primary axis, each rotatable about the primary axis; means by which to engage and disengage each lever with the input and output elements; an abaxial element such as a ring rotating on a secondary axis parallel to, but not coincident with the primary axis; and means by which to engage the abaxial element with each of the multiplicity of radiating rotatable levers and means to move abaxial with respect to the primary axis.

The multiple rotating levers bear, in succession, the input torque load from the drive element. The multiple rotating levers deliver, in succession, the output torque load to the driven element. Each lever will engage the driving and driven elements at different times through a rotation about the primary axis, with an unloaded cycle between each duty. Succession of load on the levers is determined by speed of rotation so that only the slowest and fastest rotating levers bear a load at any time. The load is conducted between the slowest and fastest levers via an abaxial ring, and it is by this ring acting on differing radii of these levers that modification of torque is achieved.

The principle of this torque converter is unaffected by the position of the devices on each lever which engage the input and output elements, but since loads and engagement lag times are reduced as the distance from the axis of rotation is increased, an advantage is seen in having the engagement devices, such as clutches, located away or distal from the axial end of each lever. The drive and driven elements will have radii corresponding to the position of their respective clutches, and so will typically take the form of disks or rings (hereafter referred to as the drive and driven rings).

This torque converter device functions the same whether the bearings for rotation are mounted within a housing or on an axle, but an advantage in terms of versatility and economy of design is seen in mounting the assembly on an axle. Further, the clutches can operate to obtain either an increase or decrease in torque with a corresponding decrease or increase in speed of rotation, respectively. If the fastest lever engages the drive ring and the slowest lever engages the driven ring, torque will be increased and speed will be decreased. If the slowest lever engages the drive ring and the fastest lever engages the driven ring, torque will be decreased and speed will be increased. For simplicity, the preferred embodiment utilizes directional clutches which engage and disengage according to the relative motion between the levers and the drive and driven rings. In this configuration, torque will be delivered from the slowest lever to the fastest lever, resulting in an increase in speed and a decrease in torque to the output elements, such as a wheel.

DETAILED DESCRIPTION OF THE PREFERRED EMBODIMENT

Figure 1A:
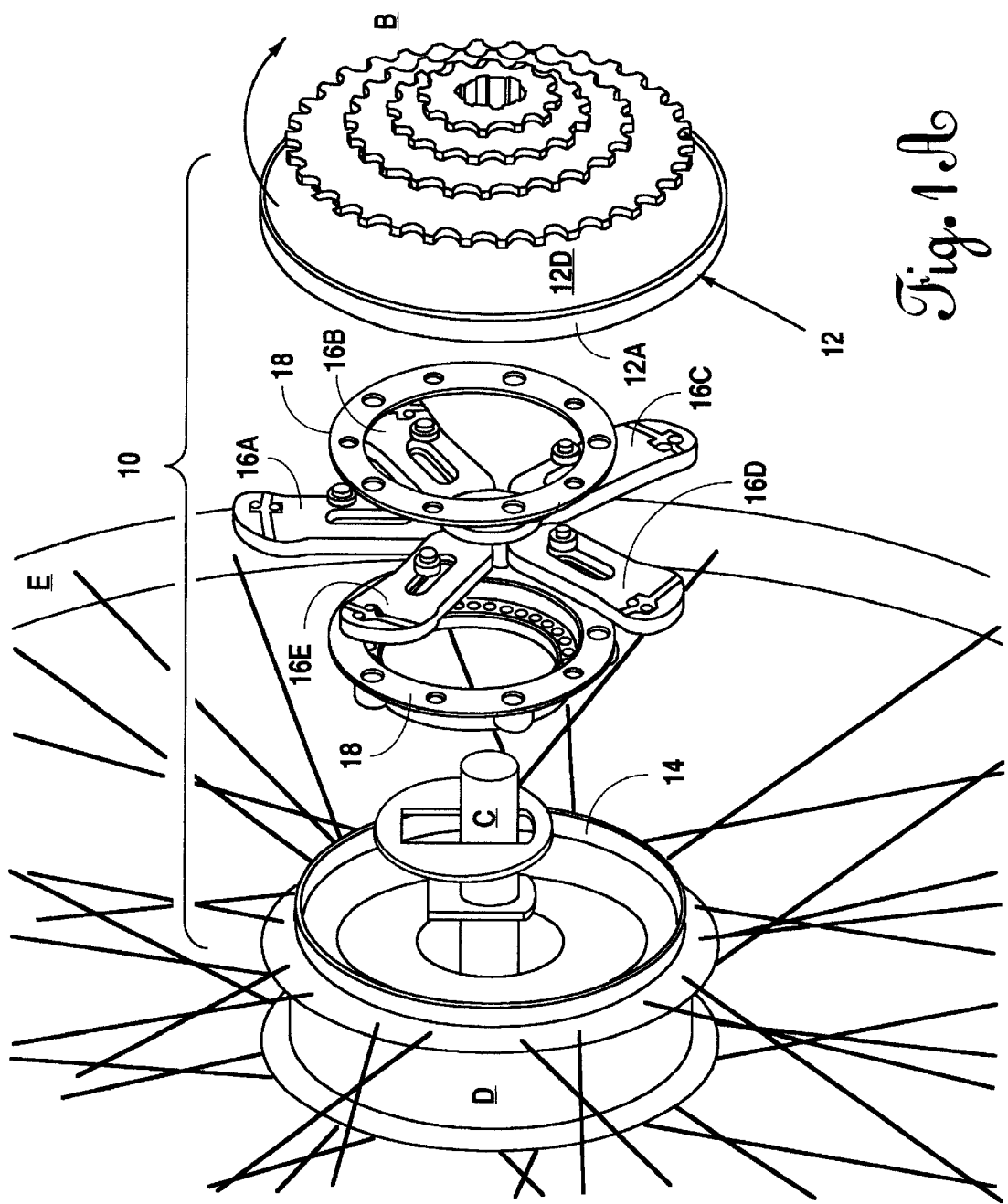
FIG. 1A is a perspective view of the torque transmission device of applicant's invention, in exploded form.

With reference to the enclosed figures, it is seen that the levers radiate from and rotate around a common axis, namely, the axis of the axle, and each lever can rotate over a limited range independently of the other levers. Each lever typically has two clutches—one for torque input (drive ring engagement) and the other for torque output (driven ring engagement). If used, for example, in the rear hub of a bicycle, this device could be located between the rear cog (or cogset) and the hub body (or other internal gearing within the hub). In such an application, the directional torque-in clutches would be driven by the drive ring attached to the cog or cogset. These clutches would ensure that no lever can rotate slower than the cog or cogset, though any lever may rotate faster. Thus, where the levers have varying rotational speeds, the driving force will be imparted to the slowest lever.

The directional torque-out clutches ensure that the driven ring will rotate no slower than any lever, though it may rotate faster, thus where the levers have varying rotational speeds, the drive force will be imparted by the fastest lever.

In the body of each lever is a radial slot and operating in each slot is a drive stud of the abaxial ring. Force can be exerted between the lever and stud at any point along the slot. The drive studs are mounted to and spaced evenly around the abaxial ring. The abaxial ring is mounted on a bearing which can be displaced away from the common axis of the levers, the drive ring, and the driven ring. When the abaxial ring has the same axis as the levers, the levers will be evenly spaced and they will all have the same rate of rotation, so the load will pass directly from the torque-in clutches to the torque-out clutches and the load will bypass this device. As the abaxial ring is displaced away from the common axis, the levers will acquire varying rotation rates (in effect, oscillating relative to one another). The levers pointing toward the axis of the abaxial ring will have slower rates of rotation than those pointing away from it. The greater the displacement of the abaxial ring, the greater the difference in rotational speed between the slowest and fastest levers. Torque enters this device at the speed of the slowest lever and exits at the speed of the fastest lever, and with the increased speed comes a proportional drop in torque.

The load path is from the drive ring, to the torque-in (drive ring) clutch on the slowest lever, to the drive stud engaging that lever, and then around the abaxial ring to the stud engaging the fastest lever, and out the torque-out (driven ring) clutch on that lever to the driven ring. Power is conveyed from the drive ring to the slowest lever purely tangentially to the drive ring rotation. Power is conveyed between the levers and the abaxial ring not quite but nearly tangentially to the lever rotation. Power is conveyed from the fastest lever to the driven ring purely tangentially to the driven ring rotation. Friction losses between the clutches and rings and between the levers and studs should be minimal. The principle energy losses will most likely be flex losses and normal bearing losses at the abaxial ring and at the center of lever rotation.

The ratio between input and output speed is not perfectly consistent once the abaxial ring is displaced to some distance from the axis of the levers. This is because the distance of the drive stud from the axis of the levers is not precisely constant through each lever's turn at bearing the load. The amount of variation is a function of two factors: 1) the amount of displacement of the abaxial ring and 2) the number of levers in the device. The less the displacement and the greater the number of levers, the less gear ratio fluctuation there is. An odd number of levers is preferable to an even number because the fluctuation of the input lever will be out of phase with the fluctuation of the output lever. Such a device with five levers, restricted to a maximum overdrive ratio of about 1 to 1.43, would have a maximum gear fluctuation of less than 4%—an amount comparable to the radial fluctuation that is already found on the smallest cogs currently used on bicycles (owing to the fact that cogs are, in effect, polygons).

The chief benefit of this device is that it makes possible minute adjustments in the gear ratio so that the cyclist will be able to easily find the exact optimal ratio to match available strength to any given combination of terrain, wind, and cargo. Because of the limited range of this device, it will probably find its most practical application in conjunction with another gearing scheme to achieve a wide gearing range, but even so, it covers a wide enough range that it can confer benefits with respect to 1) reducing the complexity, weight, and cost of the alternate gearing scheme; 2) making the alternate scheme simpler to operate; and 3) for making possible total gear ranges that would be impractical using the alternate scheme alone. If, for example, this were to be used in conjunction with a derailleur scheme (which locates the drive chain onto cogs of various sizes), a rear cogset of four cogs could replace the sets of eight or nine cogs found on many current bikes, and yet still offer a broader total range. On racing style bikes, the extra front chainring, front derailleur, and its shifter could be eliminated without any reduction in total gear range currently available. If used in conjunction with epicyclic (internal hub) gearing, the steps could be made fewer and larger, which could reduce the number of epicyclic gearsets needed along with weight, cost, and losses of energy. The weight and cost savings in whatever alternate scheme is used could at least partially offset the weight and cost of this device. It is believed there are many cyclists for whom it would be worthwhile to gain simpler operation and an unlimited number of gear ratios over a wider range than is currently available even if there is some overall increase in cost and weight.

Figure 1B:
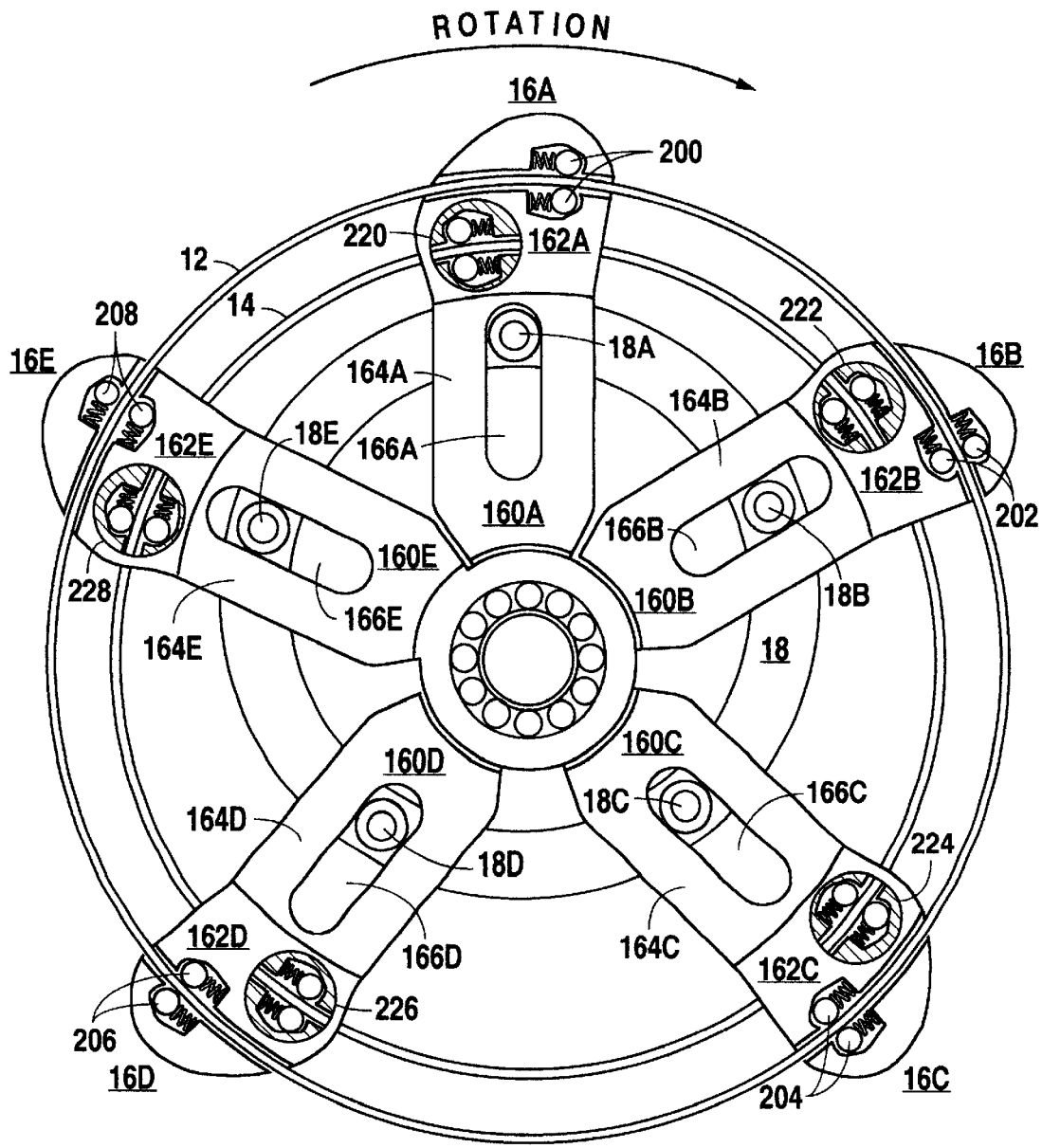
FIG. 1B is a side elevational view of the torque transmission device.

FIGS. 1A and 1B illustrate details of Applicant's torque converter 10. The torque converter 10 is seen to include a drive ring 12 and a driven ring 14, the drive and driven ring both engaging drive levers (here five in number, but that number may be smaller or larger), designated 16A through 16E. Engaging the levers is an abaxial ring 18. A multiplicity of drive ring clutches 200 through 208 and driven ring clutches 220 through 228 complete the mechanism as illustrated in FIG. 1B.

With reference to FIGS. 1A through 1F, further details of Applicant's present invention may be appreciated.

It is seen that Applicant's torque converter 10 includes a generally disk-shaped drive ring 12, which drive ring engages the cogset or sprocket set B so as to move therewith. That is, when sprocket set B is driven through a chain from the bicycle crank set, the drive ring rotates about an axle C, the axle C extending through the hub D of wheel E.

With reference to FIGS. 1A through 1F, it is seen that Applicant's drive ring includes a perimeter lip 12A which is circular about the disk-shaped body 12D.

Applicant's driven ring 14 consists of a similar perimeter lip designed to engage through fasteners or be integral with or otherwise move another member or portion of the bicycle such that ultimately the driven ring will cause the wheel to move in a direction to propel the bike forward.

With reference to FIGS. 1A through 1F, it is seen that there are a series of levers, again numbering five, and designated levers 16A through 16E. Each lever is similarly (but not necessarily identically) shaped. Each lever has a near end (axis end) 160A through 160E. Likewise, each lever has a removed end 162A through 162E. Further, each lever has a body 164A through 164E between the near and the removed end. Finally, each lever has, in the body, walls defining a slot designated 166A through 166E.

An abaxial ring 18 has a series of studs 18A through 18E arranged around said ring at angular intervals, each stud engaging a slot 166A through 166E in levers 16A through 16E, respectively.

On the removed ends 162A through 162E of levers 16A through 16E, there is a multiplicity of drive ring clutches 200, 202, 204, 206, and 208, the drive ring clutches for engaging the perimeter lip 12A of the drive ring. Also on the removed ends 162A through 162E of levers 16A through 16E are a series of driven ring clutches 220, 222, 224, 226, and 228 for engaging driven ring 14. That is, on the removed ends of each lever is a drive ring clutch and a driven ring clutch.

At the near end of each lever is a cut-out for a set of bearings. That is, each of the five (or whatever number) levers have at the near end cut-outs for needles, roller bearings, bushings, or other means by which they can articulate with axle C and revolve freely about said axle.

Further, it should be appreciated that the distance from the origin (axis) of the levers to the drive ring clutches on the removed ends of the levers for each of the levers is the same for all of the levers, and the distance from the origin of the levers to the driven ring clutches on the removed ends of the levers for each of the levers is the same for all of the levers. Further still, it is seen with reference to the figures that the studs of the abaxial ring may travel (for example, by sliding or rolling) in the slots of the levers.

Lastly, and importantly, it should be noted with reference to FIGS. 1A through 1F that in operation, the axis of rotation of the abaxial ring is not coincident with, but is parallel to, the common axis of rotation of the levers, drive ring, and driven ring.

With an understanding of the components as set forth with reference to the figures and explanations above, Applicant will again briefly summarize the operation of the torque converter. The condition of the abaxial ring will be such that its axis is not coincident with the axis of the axle (i.e., the device is acting to convert torque).

A bicycle rider through pedalling action causes to be applied to cogset B a torque which would tend to cause the cogset to be rotated in the direction indicated in FIG. 1A by the arrow adjacent the drive ring. The cogset is in turn coupled to the drive ring and causes the drive ring to rotate at the same speed and in the same direction that the cogset is rotating.

The rotating drive ring will cause to engage at least one of the drive ring clutches, namely that of the slowest rotating lever, and cause that lever to rotate at the same speed as the drive ring. The drive ring will not cause to engage the drive ring clutches of the levers rotating faster than the drive ring. The rotation of the slowest lever will cause abaxial ring 18 to rotate at an angular speed greater than that of the slowest lever, and abaxial ring 18 will in turn cause the fastest lever to rotate at an angular speed greater than that of the abaxial ring. The driven ring clutch of the fastest lever will engage the driven ring and cause it to rotate at the same rate as the fastest lever. The driven ring clutches of levers rotating slower than the driven ring will not engage the driven ring.

With this understanding and with reference to FIGS. 1A through 1F, and with reference to the notes on the figures, an explanation of torque transfer and conversion between the drive ring and the driven ring follows.

Figure 1C:
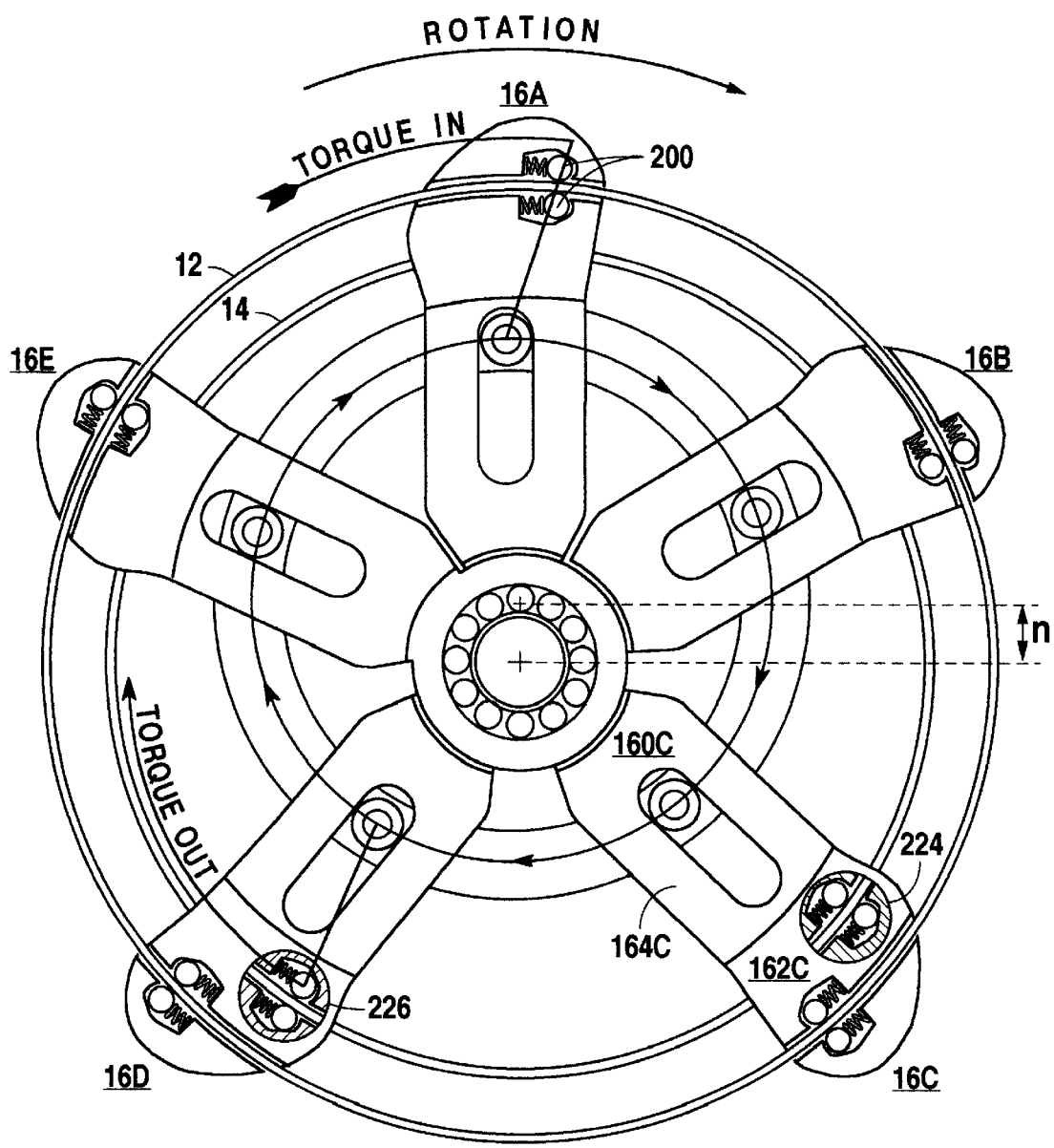
FIG. 1C is a side elevational view of the torque transmission device, with the levers in the position as shown in FIG. 1B but with arrows showing the transmission of the torque load.

Turning to FIG. 1C, at the instant of time shown, clutch 200 is engaged with drive ring 12, and through clutch 200, lever 16A is being urged to rotate about its axis by the drive ring at the same rate of rotation as the drive ring. The rotation of lever 16A urges the rotation of the other levers through the studs on the abaxial ring. Further, it can be seen that lever 16A is moving slower than levers 16B through 16E owing to the fact that the stud in the slot on lever 16A is acting at a greater distance from the center of rotation of the levers than the distances of the studs acting on each of the other four levers. Because levers 16B through 16E are rotating faster than drive ring 12, drive ring 12 cannot engage the drive ring clutches of levers 16B through 16E. By extension, it can be seen that at the instant illustrated in FIG. 1C, the fastest moving levers are levers 16C and 16D with equal velocities at this instant because the studs engaging 16C and 16D are acting at an equal distance from the axis of the levers, that distance being less than the distances for the studs acting on each of the other three levers. However, lever 16C is accelerating while lever 16D is decelerating. In the next instant lever 16C will attempt to rotate faster than driven ring 14, causing its clutch 224 to engage the driven ring. As lever 16D decelerates, clutch 226 will not be able to keep up with the driven ring, and will release.

Figure 1D:
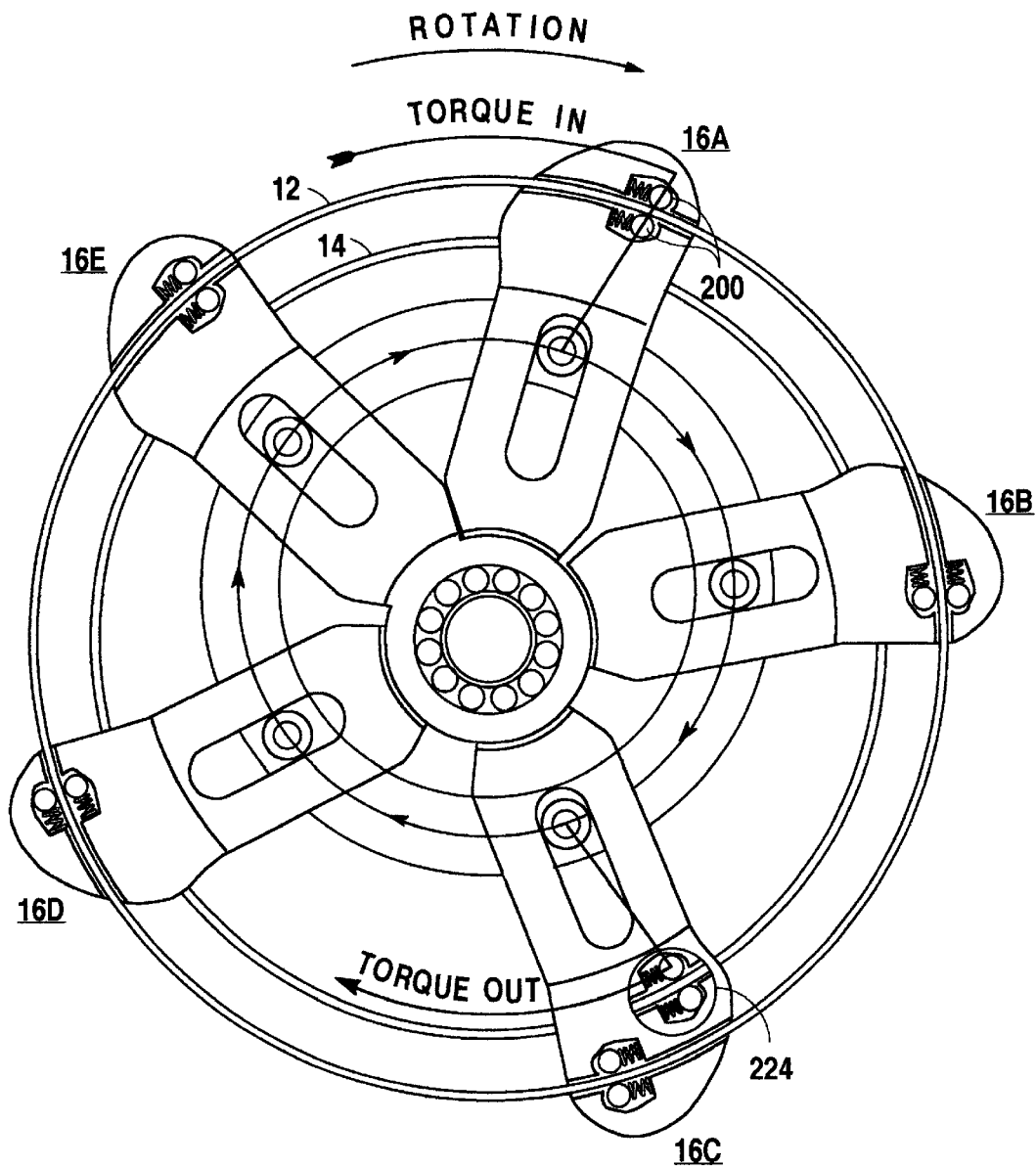
FIG. 1D is the same view as FIG. 1C but with the abaxial ring rotated about 18 degrees, with the resulting change of position of the levers.

At the instant depicted in FIG. 1D the abaxial ring has advanced 18 degrees from FIG. 1C. Lever 16A has the slowest rate of rotation, so drive ring 12 drives lever 16A via clutch 200. No other drive clutch is engaged. Lever 16C has the fastest rate of rotation, so lever 16C drives driven ring 14 via clutch 224. No other driven clutch is engaged.

Figure 1E:
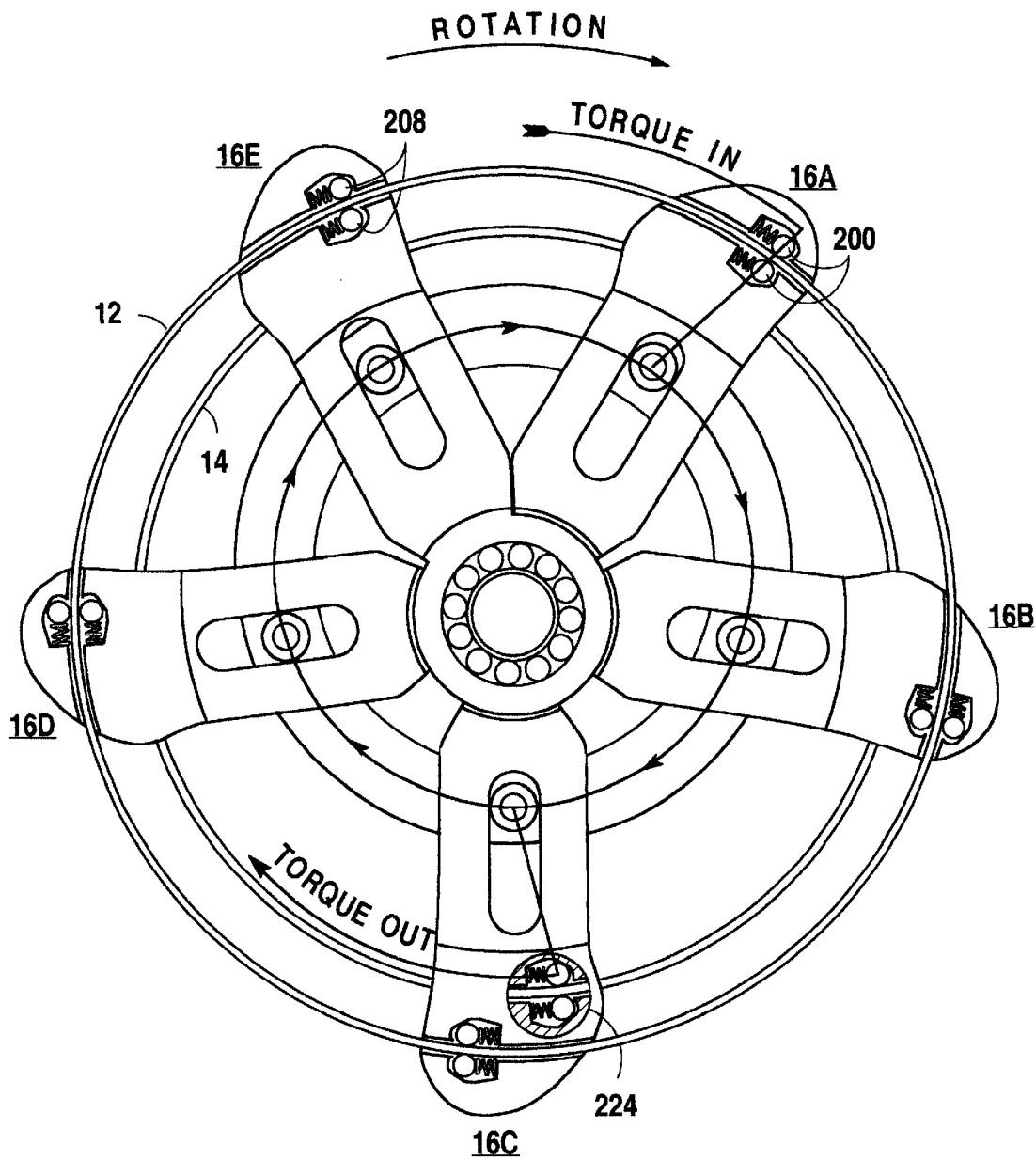
FIG. 1E is the same view as FIG. 1C but with the abaxial ring rotated about 36 degrees from the position illustrated in FIG. 1C, with the resulting change of position of the levers.

At the instant depicted in FIG. 1E the abaxial ring has advanced 36 degrees from FIG. 1C. It can be seen that levers 16A and 16E are matched for slowest rates of rotation. Lever 16A is accelerating so clutch 200 is disengaging from drive ring 12. Lever 16E is decelerating so clutch 208 is engaging with drive ring 12. Lever 16C has the fastest rate of rotation so lever 16C drives driven ring 14 via clutch 224.

Figure 1F:
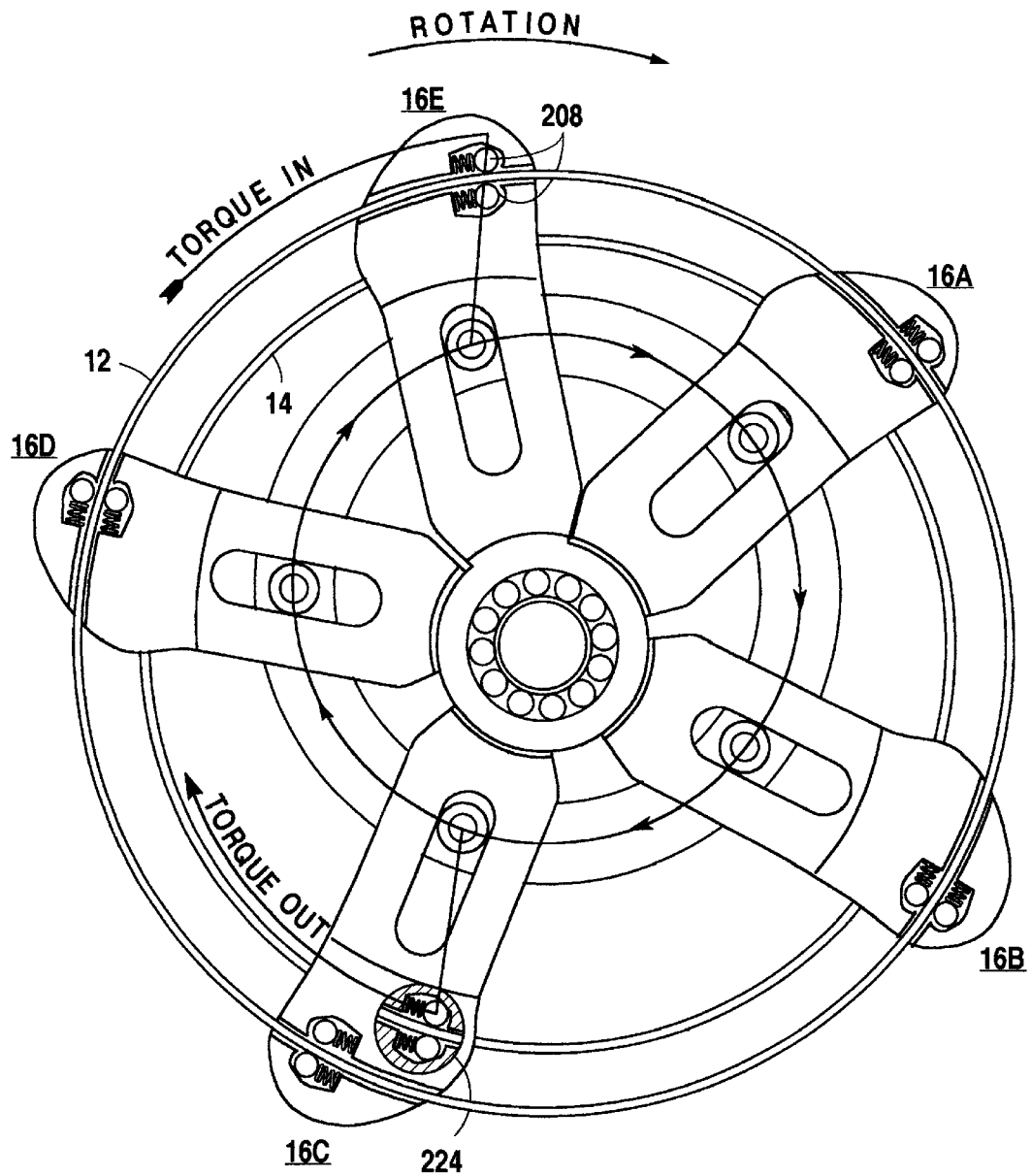
FIG. 1F is the same view as FIG. 1C but with the abaxial ring rotated about 54 degrees from position illustrated in FIG. 1C, with the resulting change at the position of the levers.

At the instant depicted in FIG. 1F, the abaxial ring has advanced 54 degrees from FIG. 1C. Lever 16E has the slowest rate of rotation so drive ring 12 drives lever 16E via clutch 208. Lever 16C has the fastest rate of rotation so lever 16C drives driven ring 14 via clutch 224. Another 18 degrees rotation of the abaxial ring and each lever will then occupy the position of the lever that preceded it in FIG. 1C and the cycle will repeat.

Figure 2A:
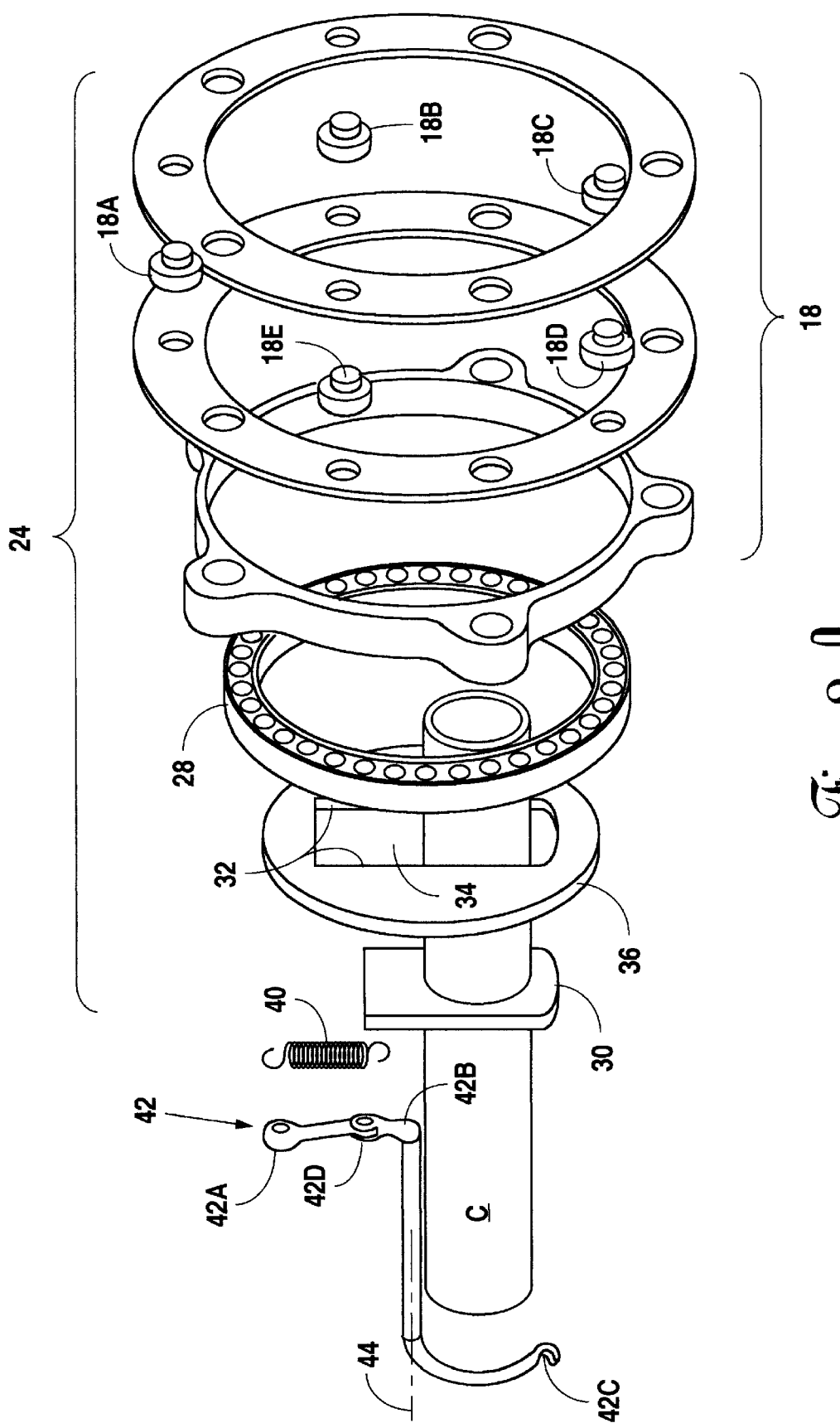
FIG. 2A is an exploded perspective view of the abaxial ring and carriage assembly cooperating with the axle.
Figure 2B:
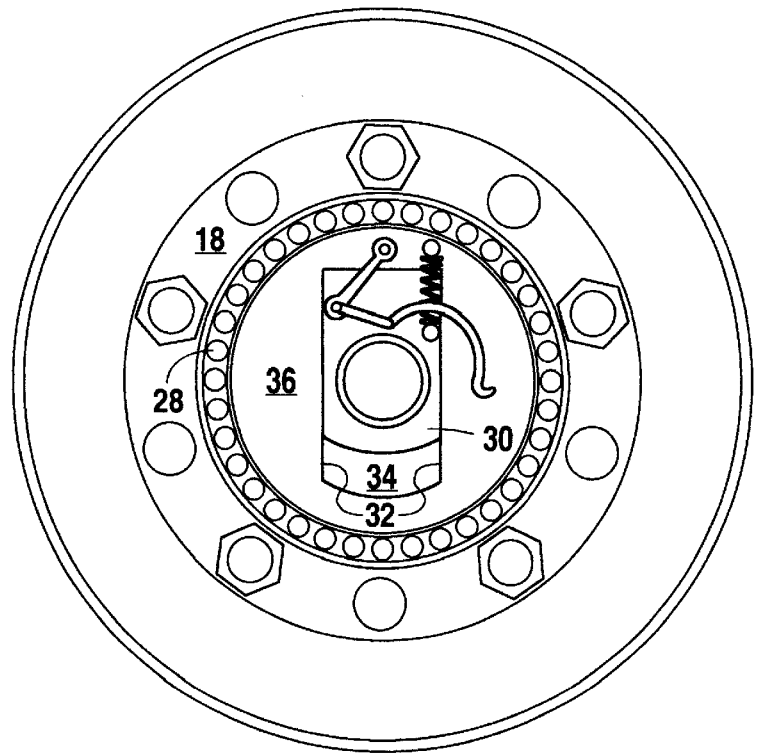
FIGS. 2B and 2C are side elevational cutaway views of the carriage assembly and abaxial ring, with FIG. 2B illustrating the abaxial ring coincident with the axle and FIG. 2C illustrating the abaxial ring displaced from the axle.
Figure 2C:
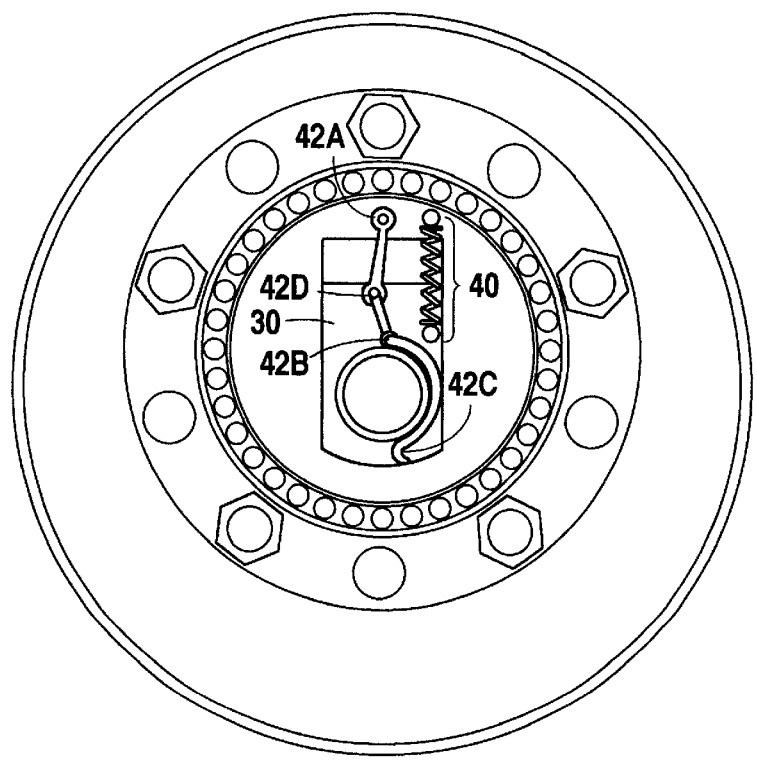

FIGS. 2A through 2C illustrate details of the Applicant's abaxial ring assembly 24. The function of the abaxial ring assembly, of which abaxial ring 18 is a part, is to move the axis of the abaxial ring from a position of rotation coincident with the axis of the axle (and, therefore, of the drive ring, driven ring, and rotating levers) to a position non-coincident or spaced away from (but still parallel to) the axis of the axle, and thereby affecting the amount of torque conversion between the drive ring and the driven ring. Moreover, the distance of displacement between the two axes of rotation (the axis of the abaxial ring and the axis of the axle) will correspondingly vary the amount of speed differential (torque conversion) between the drive and driven rings.

The abaxial ring assembly 24 includes the abaxial ring 18 mounted to a carriage plate 36 through a series of ball (or roller, or other) bearings 28. The carriage plate 36 does not rotate, but instead, is slideably mounted to the axle C through the use of a transverse section 30, typically, a plate dimensioned to slideably engage walls 32 of cut-out 34 near the center of carriage plate 36.

Turning down to FIGS. 2B and 2C, as well as continuing reference to FIG. 2A, it is seen that carriage plate 36 may be caused to slide with respect to transverse section 30 (fixed to the axle) by the actuation of knuckle shift linkage 42.

Normally, spring 40 will maintain plate 36 centered on axle C in the position indicated in FIG. 2B where the axis of rotation of the abaxial ring is the same as the axis of the axle, rotating levers, and the drive and driven rings. This position will provide no torque conversion between the drive and driven rings; that is, the torque will pass unmodified from the drive ring to the driven ring giving them the same rates of rotation while torque is applied. However, as force, such as that from a cable attached to a rider-actuated twist grip on the handlebar of a bike, is applied to actuator arm 42C, plate 36 is removed toward the position indicated in FIG. 2C, which position locates the axis of rotation of the abaxial ring away from the axis of the axle (and, therefore, the axis of rotation of the drive ring, driven ring, and levers).

This is done through the use of shift linkage 42, which shift linkage is knuckled and has a first end 42A and a second end 42B. The first end 42A is rotatably pinned adjacent plate 36 and the second end is rotatably pinned adjacent transverse section 30, such as on axis 44. (See also FIG. 3.) With reference to knuckle 42D and the remaining structure of shift linkage 42, as seen in FIGS. 2A through 2C and FIG. 3, it may be appreciated that when a force is applied to 42C, the configuration between the transverse section 30 and the carriage plate 36 (and, therefore, bearing 28 and abaxial ring 18) will move from that position illustrated in FIG. 2B to the position illustrated in FIG. 2C. Further, when the force applied to 42C is released, spring 40 will return carriage plate 36 back to the position illustrated in FIG. 2B. This may be done as a smooth, continuous movement, such as through rider-actuated rotation of a handlebar-mounted twist grip (or lever) which the bicycle rider can use to move the carriage assembly to any position between the position shown in FIG. 2B (which represents no torque conversion) and the position shown in FIG. 2C (which represents maximal torque conversion) and thus correspondingly affect the amount of torque conversion between the drive and driven rings.

If this torque converter is used with an alternate gearing scheme (such as is represented by cogset B) then the rider may begin in a low gear with the carriage positioned as shown in FIG. 2B for no torque conversion, then gradually increase the amount of torque conversion as the rider's speed increases until he reaches the limit shown in FIG. 2C, at which point he may move it back to the position in FIG. 2B and shift to a higher gear, and begin again to gradually increase the amount of torque conversion as his speed continues to increase. Conversely, if his speed is decreasing, he may gradually decrease torque conversion until the carriage reaches the limit shown in FIG. 2B, at which point he may move the carriage back to the position in FIG. 2C and shift to a lower gear, and then begin again to gradually decrease the amount of torque conversion as his speed continues to decrease.

Figure 3:
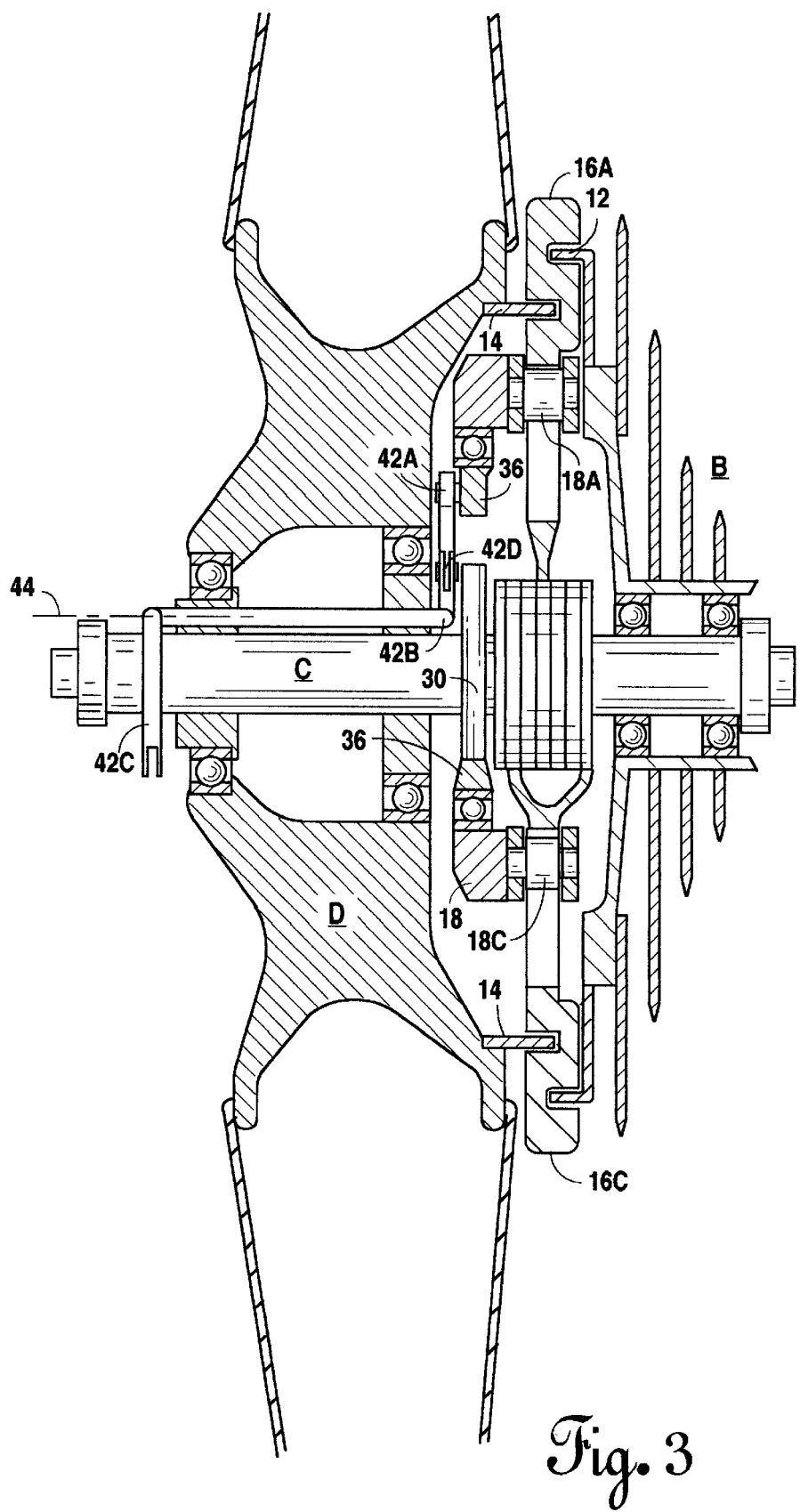
FIG. 3 is a cross-sectional view of the torque transmission device illustrated in conjunction with an external gear set, hub, and axle.

FIG. 3 illustrates the hub, torque converter and cogset in cross section. For simplification lever 16A is shown as being directly opposite lever 16C whereas in reality, with an odd number of levers, they would be only approximately opposite. The -drive and driven rings are shown to be of different diameters for reasons of axial compactness, as this makes possible an overlap between the drive and driven rings, but the drive and driven rings could just as well have the same diameter where radial compactness is desired.

Figure 4A:
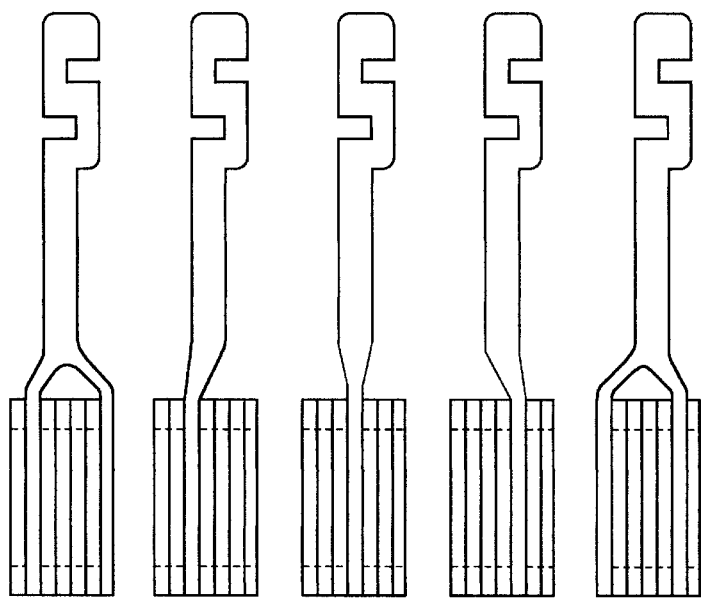
FIGS. 4A–4D illustrate various views of the levers apart from the rest of the device.
Figure 5A:
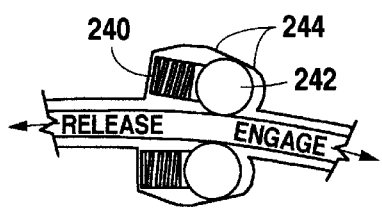
FIGS. 5A and 5B illustrate details, and elevational view, of two embodiments of ring engagement means.
Figure 5B:
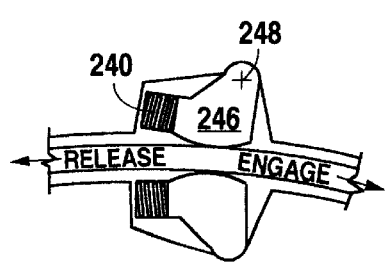
Figures 4B, 4C, 4D:
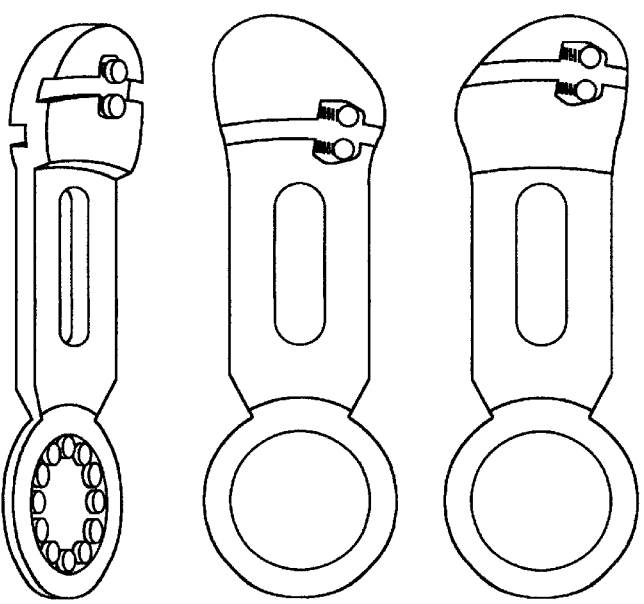

It can be seen with reference to FIGS. 3 and 4A that the levers, at the near end thereof, may be forked (some of the levers may be forked and some may not be). FIG. 5A shows detail of a preferred directional ring clutch with spring 240, cylindrical roller 242, and inclined surface 244, such a clutch serving for both drive and driven rings. When the ring moves relative to the clutch in the direction marked to engage, the roller wedges between inclined surface 244 and the ring surface. When the ring moves in the direction marked to release, the roller is no longer wedged and the ring can proceed in that direction relative to the clutch while spring 240 holds the roller in contact with the inclined surface and the ring surface. FIG. 5B shows detail of an alternate directional ring clutch with spring 240, and cam 246 pivotable about axis 248, such a clutch serving for both drive and driven rings. When the ring moves to engage, the pivot forces the cam face against the ring surface. When the ring moves to release, the spring holds the cam face against the ring surface.

Figure 6A:
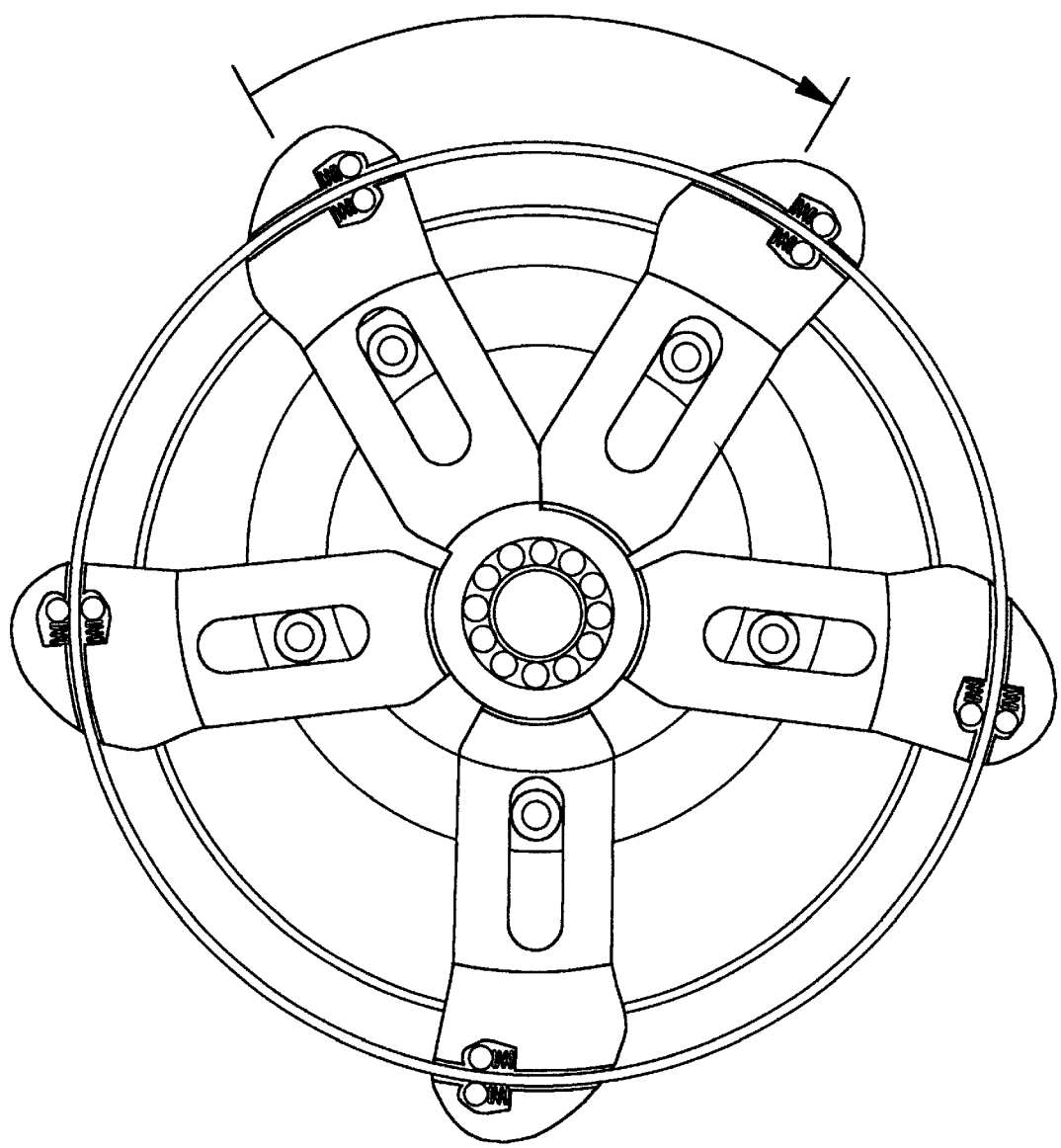
FIGS. 6A and 6B are views to assist an explanation of the operation of applicant's device showing representative examples of torque input (FIG. 6A) in torque output (FIG. 6B) ranges.
Figure 6B:
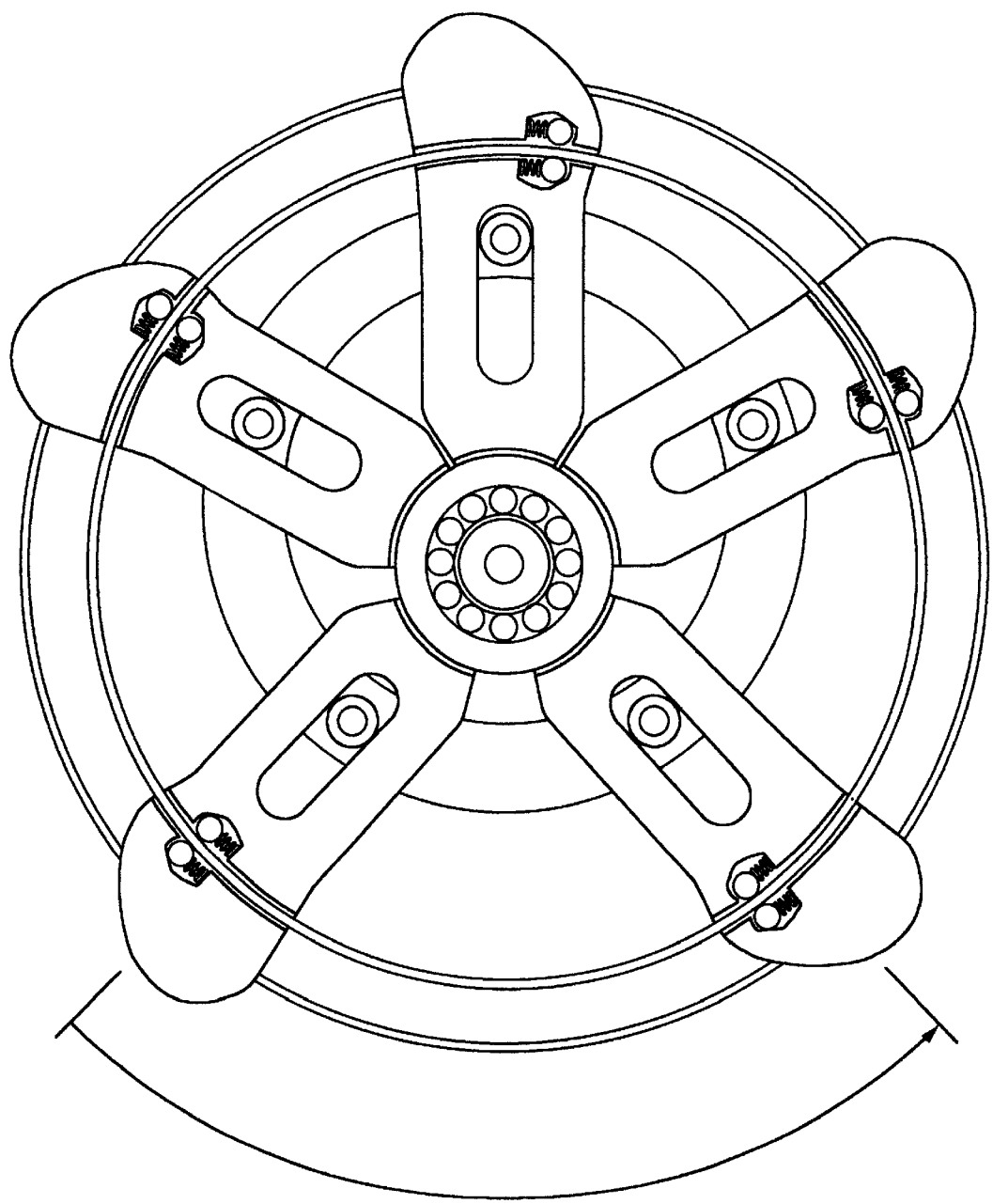
Figure 7:
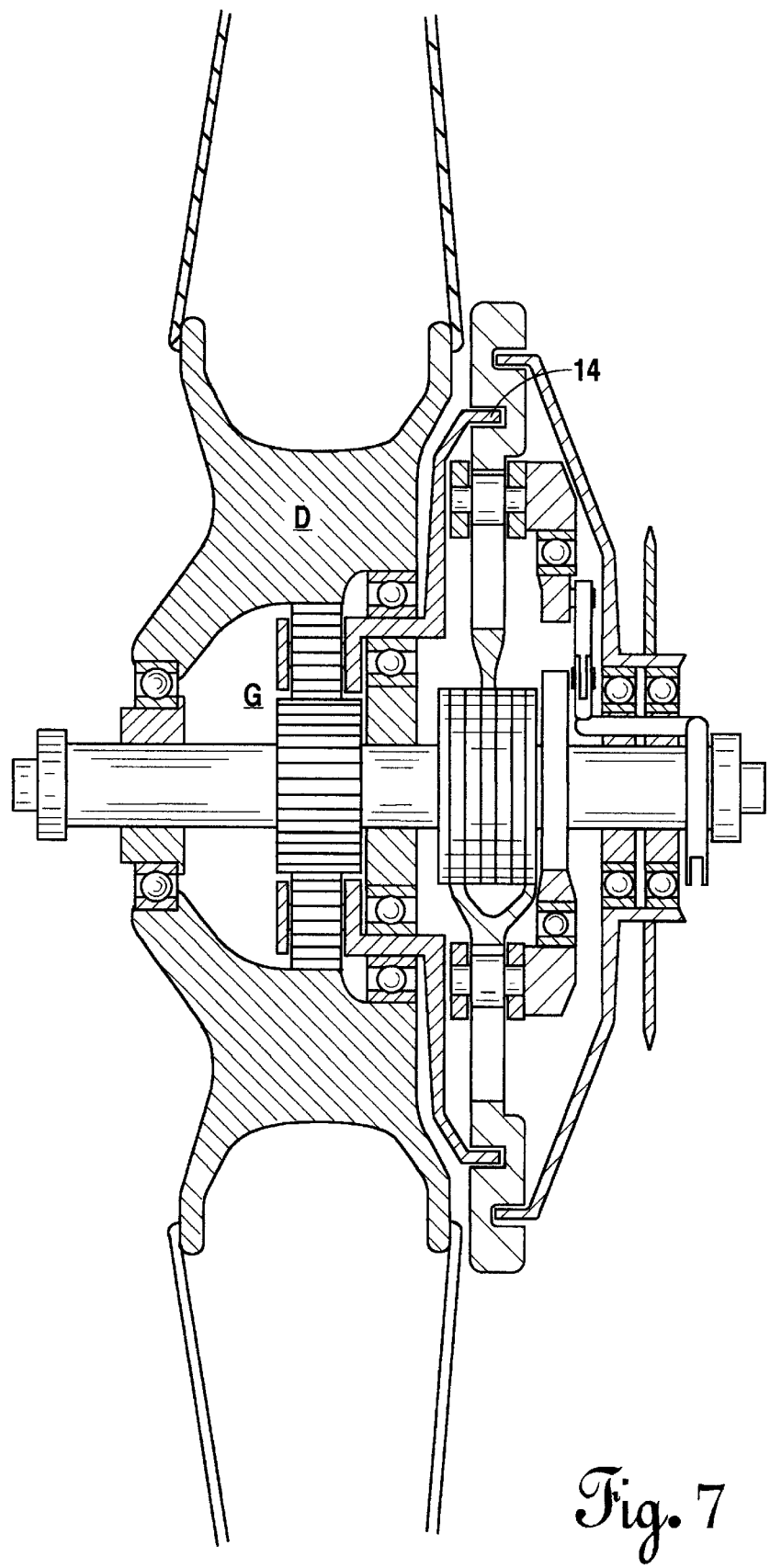
FIG. 7 is a sectional view illustrating the torque transmission device used with an internal axle mounted gear set driving the hub of a wheel.

FIG. 6A shows the approximate range of rotation of the levers through which drive ring clutches will be engaged with the drive ring, and FIG. 6B shows the range through which the driven ring clutches will be engaged with the driven ring. The angle of the range given in FIG. 6A decreases and the angle of the range given in FIG. 6B increases as the abaxial ring is displaced progressively away from the axis of the axle. FIG. 7 shows the torque converter used in conjunction with an internal gearing scheme, wherein driven ring 14 drives gears G which in turn drive the hub D.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A torque transmission device comprising:
    a drive element rotatable about a primary axis serving as means for torque input;
    a driven element with an axis of rotation coincident with the primary axis serving as means for torque output;
    a multiplicity of separate rotatable levers, having an axis of rotation coincident with the primary axis;
    a multiplicity of drive element engagement devices for engaging and disengaging each of the rotatable levers with the drive element;
    a multiplicity of driven element engagement devices for engaging and disengaging each of the rotatable levers with the driven element;
    an abaxial ring with a multiplicity of lever-engaging members arranged at angular intervals thereon such that each lever is engaged to the abaxial ring, the abaxial ring being rotatable about a secondary axis of rotation; and
    a carriage means by which the abaxial ring may be moved so the secondary axis of rotation is non-coincident, but parallel with the primary axis;
    wherein torque applied to the drive element engages, through some of the multiplicity of drive element engagement devices, some of the
    rotatable levers, which in turn, engage some of the multiplicity of the lever-engaging members of the abaxial ring, which torque is transferred to other lever-engagement members of the abaxial ring which, in turn, transfer torque to other of the rotating levers which, in turn, rotate the driven element through engagement of some of the multiplicity of driven element engagement devices with the driven element.

2. The torque transmission device of claim 1 wherein said drive element serving as means for torque input and said driven element serving as means for torque output are rings rotatable about the primary axis.

3. The torque transmission device of claim 1 further including an axle and wherein the primary axis is coincident with the axle.

4. An axle-mounted transmission device comprising:
    a drive ring with an axis of rotation coincident with the axis of the axle;
    a driven ring with an axis of rotation coincident with the axis of the axle;
    a multiplicity of separate rotatable levers, having an axis of rotation coincident with those of the drive and driven rings;
    a multiplicity of drive ring engagement devices for engaging and disengaging each of the rotatable levers with the drive ring;
    a multiplicity of driven ring engagement devices for engaging and disengaging each of the rotatable levers with the driven ring;
    an abaxial ring with a multiplicity of lever-engaging elements arranged at angular intervals thereon such that each of the levers is engaged to the abaxial ring, the abaxial ring having a second axis of rotation; and
    a carriage means for engaging the abaxial ring to the axle such that the abaxial ring may be moved so the second axis of rotation is non-coincident, but parallel with the axis of the axle;
    wherein torque applied to the drive ring engages, through some of the multiplicity of drive ring engagement devices, some of the rotatable levers, which in turn, engage some of the multiplicity of the lever-engaging elements of the abaxial ring, which torque is transferred to other lever-engaging elements of the abaxial ring which, in turn, transfer torque to other of the rotatable levers which, in turn, rotate the driven ring through engagement of some of the multiplicity of driven ring engagement devices with the driven ring.

5. The axle-mounted transmission device of claim 4 wherein said drive ring engagement devices and said driven ring engagement devices are clutches.

6. The axle-mounted transmission device of claim 5 wherein said clutches are directional in nature.

7. The axle-mounted transmission device of claim 6 wherein said directional clutches include wedge means.

8. The axle-mounted transmission device of claim 4 wherein the lever engaging elements of the abaxial ring are studs.

9. The axle-mounted transmission device of claim 7 wherein the wedge means includes at least one spring-loaded cylindrical roller and an inclined surface to urge the roller against the ring.

10. The axle-mounted transmission device of claim 7 wherein the wedge means include at least one spring-loaded cam with a pivot axis to urge the cam face against the ring.

11. The axle-mounted transmission device of claim 4 further including a multiplicity of chain-driven gears for rotating the drive ring.

12. The axle-mounted transmission device of claim 4 further including a multiplicity of gears driven by the driven ring.

13. The axle-mounted transmission device of claim 4 wherein the carriage means for moving the abaxial ring include means to provide a mechanical advantage.

14. A transmission device comprising:

a torque input means;

a torque output means; the torque input means and the torque output means rotatable about a primary axis;

a set of levers separately articulated with the primary axis, the set of levers having an axis of rotation coincident with the primary axis each lever of the set of levers acting in operative association with the torque input and torque output means; and a rotatable lever engagement device for engaging all of the levers of the single set of levers to transfer torque input at some of the levers to torque output at other of the levers, the rotatable lever engagement device including means to move the axis of rotation of the rotatable lever engagement device with respect to the primary axis.

15. The transmission device of claim 14 further including an axle, wherein the primary axis is coincident with the axle.

16. The transmission device of claim 14 wherein either of the torque input means or the torque output means is a ring rotatable about the primary axis.

17. The transmission device of claim 14 wherein the means to move the rotatable lever engagement device with respect to the primary axis include means to provide a mechanical advantage.

18. The transmission device of claim 14 wherein each lever of the set of levers include clutches.

19. The transmission device of claim 18 wherein the clutches are directional in nature.

20. The transmission device of claim 19 wherein the directional clutches include wedge means for engaging the torque input or torque output means.

* * * * *